United States Patent
Hayek et al.

(10) Patent No.: US 12,083,474 B2
(45) Date of Patent: Sep. 10, 2024

(54) STACKED MEMBRANES AND THEIR USE IN GAS SEPARATION

(71) Applicant: Saudi Arabian Oil Company, Dhahran (SA)

(72) Inventors: Ali Hayek, Dhahran (SA); Yasser A. Shalabi, Dhahran (SA); Seung-Hak Choi, Dhahran (SA); Abdulkarim Alsamah, Dhahran (SA)

(73) Assignee: Saudi Arabian Oil Company, Dhahran (SA)

(\*) Notice: Subject to any disclaimer, the term of this patent is extended or adjusted under 35 U.S.C. 154(b) by 203 days.

(21) Appl. No.: 17/551,519

(22) Filed: Dec. 15, 2021

(65) Prior Publication Data

US 2023/0182070 A1    Jun. 15, 2023

(51) Int. Cl.
| | |
|---|---|
| *B01D 53/22* | (2006.01) |
| *B01D 63/02* | (2006.01) |
| *B01D 63/08* | (2006.01) |
| *B01D 71/64* | (2006.01) |
| *C10L 3/10* | (2006.01) |

(52) U.S. Cl.
CPC ........... *B01D 53/228* (2013.01); *B01D 63/02* (2013.01); *B01D 63/082* (2013.01); *B01D 71/64* (2013.01); *C10L 3/103* (2013.01); *C10L 3/104* (2013.01); *C10L 2290/548* (2013.01)

(58) Field of Classification Search
CPC .. B01D 2319/06; B01D 71/64; B01D 63/082; B01D 53/228; B01D 63/02; C10L 3/104; C10L 2290/548; C10L 3/103
See application file for complete search history.

(56) References Cited

U.S. PATENT DOCUMENTS

| | | | |
|---|---|---|---|
| 3,980,456 A | 9/1976 | Browall | |
| 4,164,437 A | 8/1979 | Henne et al. | |
| 4,180,388 A * | 12/1979 | Graham | C01C 1/0476 |
| | | | 95/55 |
| 4,230,463 A | 10/1980 | Henis et al. | |
| 4,687,578 A * | 8/1987 | Stookey | B01D 69/00 |
| | | | 96/10 |
| 5,051,114 A * | 9/1991 | Nemser | B01D 53/228 |
| | | | 95/55 |
| 5,085,676 A | 2/1992 | Ekiner et al. | |

(Continued)

OTHER PUBLICATIONS

Decher et al., "Layer-by-layer assembled multicomposite films," Current Opinion in Colloid & Interface Science, 1998, 3:32-39, 8 pages.

(Continued)

*Primary Examiner* — Anthony R Shumate
(74) *Attorney, Agent, or Firm* — Fish & Richardson P.C.

(57) ABSTRACT

A membrane system includes a first membrane and a second membrane. At a given temperature and pressure: the first membrane has a permeation rate for a first gas and a selectivity for a gas mixture comprising the first gas a second gas different from the first gas; the second membrane has a permeation rate for the first gas and a selectivity for the gas mixture; the permeation rate of the first membrane is greater than the permeation rate of the second membrane; and the selectivity of the second membrane is greater than the selectivity of the first membrane.

19 Claims, 10 Drawing Sheets

(56) References Cited

U.S. PATENT DOCUMENTS

| | | | |
|---|---|---|---|
| 5,102,432 A * | 4/1992 | Prasad | C01B 21/045 |
| | | | 96/9 |
| 5,160,353 A | 11/1992 | Gochanour | |
| 6,035,641 A * | 3/2000 | Lokhandwala | B01D 53/22 |
| | | | 60/671 |
| 6,896,717 B2 | 5/2005 | Pinnau et al. | |
| 7,758,751 B1 * | 7/2010 | Liu | C10G 31/11 |
| | | | 95/45 |
| 8,075,951 B2 | 12/2011 | Cunningham et al. | |
| 8,911,540 B2 | 12/2014 | Baer et al. | |
| 9,168,490 B2 * | 10/2015 | Majumdar | B01D 69/02 |
| 9,808,772 B2 | 11/2017 | Mochizuki | |
| 9,853,125 B2 * | 12/2017 | Chuang | H01L 29/66356 |
| 10,022,677 B2 | 7/2018 | He et al. | |
| 11,071,953 B2 | 7/2021 | Mochizuki et al. | |
| 2008/0167512 A1 * | 7/2008 | Sanders | B01D 53/226 |
| | | | 585/818 |
| 2008/0295691 A1 | 12/2008 | Liu et al. | |
| 2010/0212501 A1 * | 8/2010 | Peters | B01D 53/227 |
| | | | 96/8 |
| 2011/0077446 A1 * | 3/2011 | Shanbhag | B01D 53/72 |
| | | | 585/818 |
| 2011/0305310 A1 * | 12/2011 | Sanchez | B01D 53/227 |
| | | | 95/55 |
| 2015/0265964 A1 † | 9/2015 | Kodama et al. | |
| 2015/0298436 A1 | 10/2015 | Baer et al. | |
| 2016/0236141 A1 * | 8/2016 | Merkel | C07C 7/144 |
| 2017/0080381 A1 * | 3/2017 | Bocciardo | B01D 71/64 |
| 2018/0043298 A1 † | 2/2018 | Liskey | |

OTHER PUBLICATIONS

Ding et al., "Fabrication of high performance Matrimid/polysulfone dual-layer hollow fiber membranes for O2/N2 separation," Journal of Membrane Science, 2008, 323:352-361, 10 pages.

He et al., "An improved resistance model for gas permeation in composite membranes," Journal of Membrane Science, 1996, 118:1-7, 7 pages.

Henis et al., "Composite hollow fiber membranes for gas separation: the resistance model approach," Journal of Membrane Science, 1981, 8:233-246, 14 pages.

Joseph et al., "Layer-by-Layer preparation of polyelectrolyte multilayer membranes for separation," Polymer Chemistry, 2014, 5:1817-1831, 19 pages.

Peng et al. "Evolution of ultra-thin dense-selective layer from single-layer to dual-layer hollow fibers using novel Extem® polyetherimide for gas separation," Journal of Membrane Science, 2010, 360:48-57, 10 pages.

Xia et al., "Structure design and applications of dual-layer polymeric membranes," Journal of Membrane Science, 2018, 562:85-111, 106 pages.

A J Ashworth, Relation between gas permselectivity and permeability in a bilayer composite membrane, pp. 169-173, Mar. 2, 1992, Elsevier Science Publishers B V, Amsterdam.†

\* cited by examiner
† cited by third party

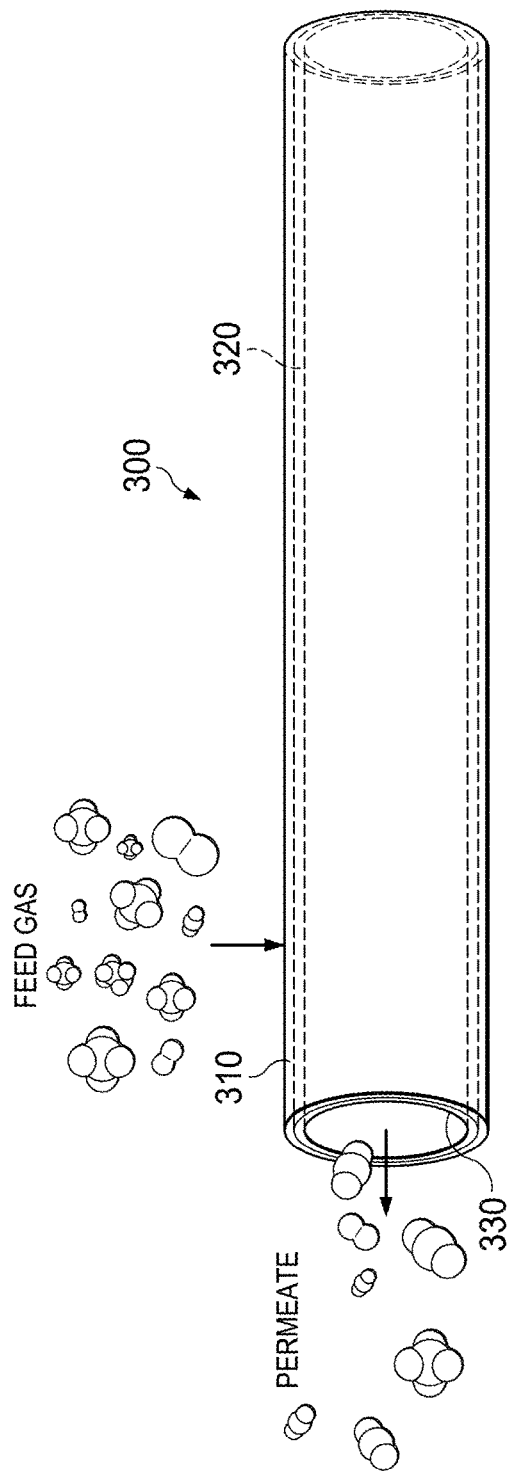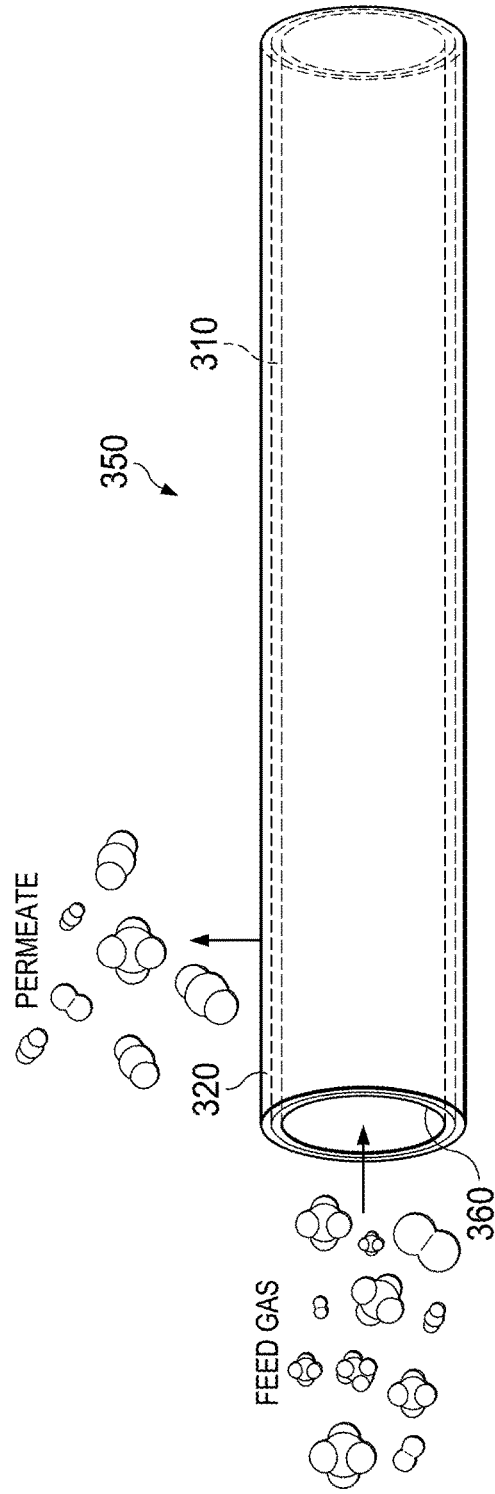

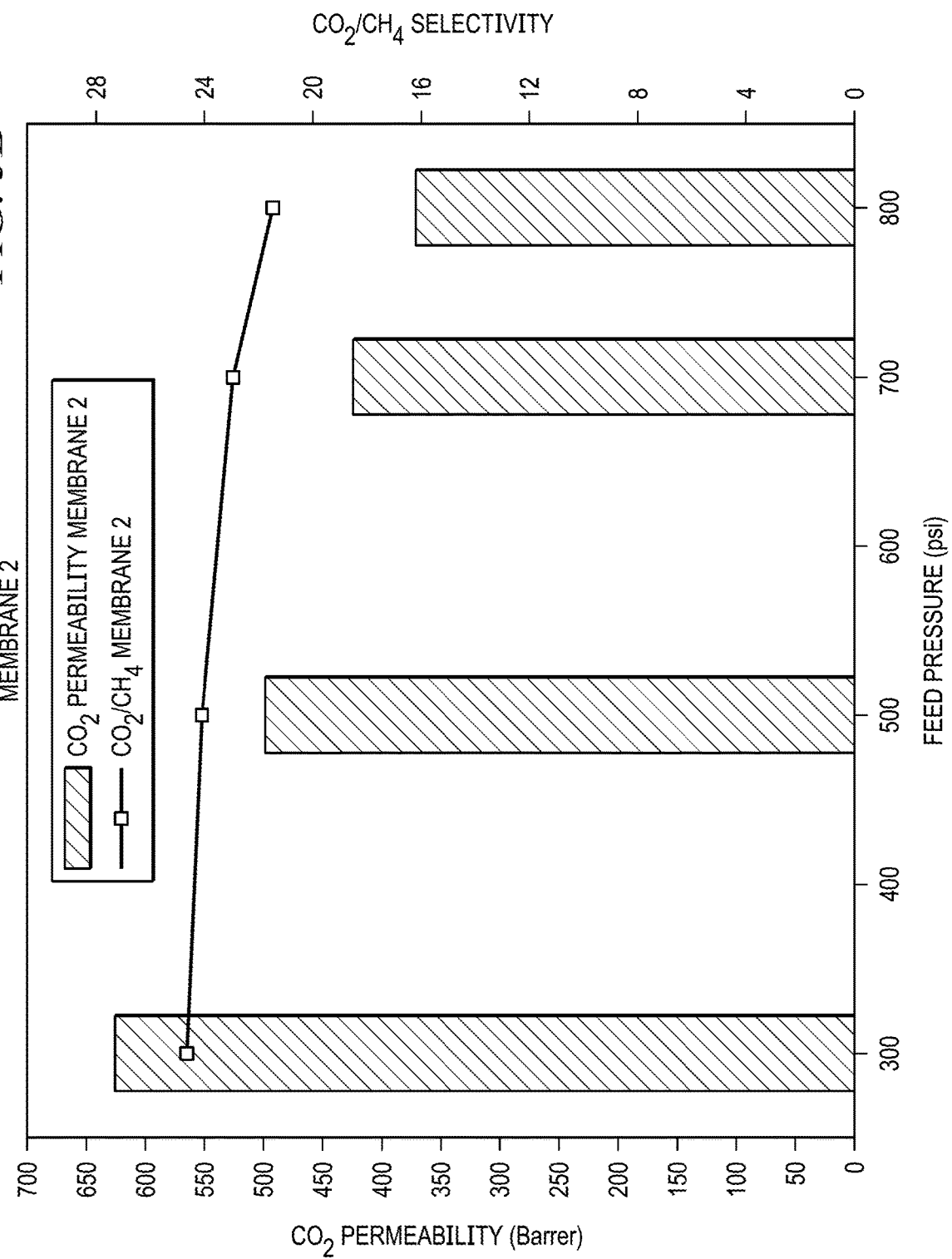

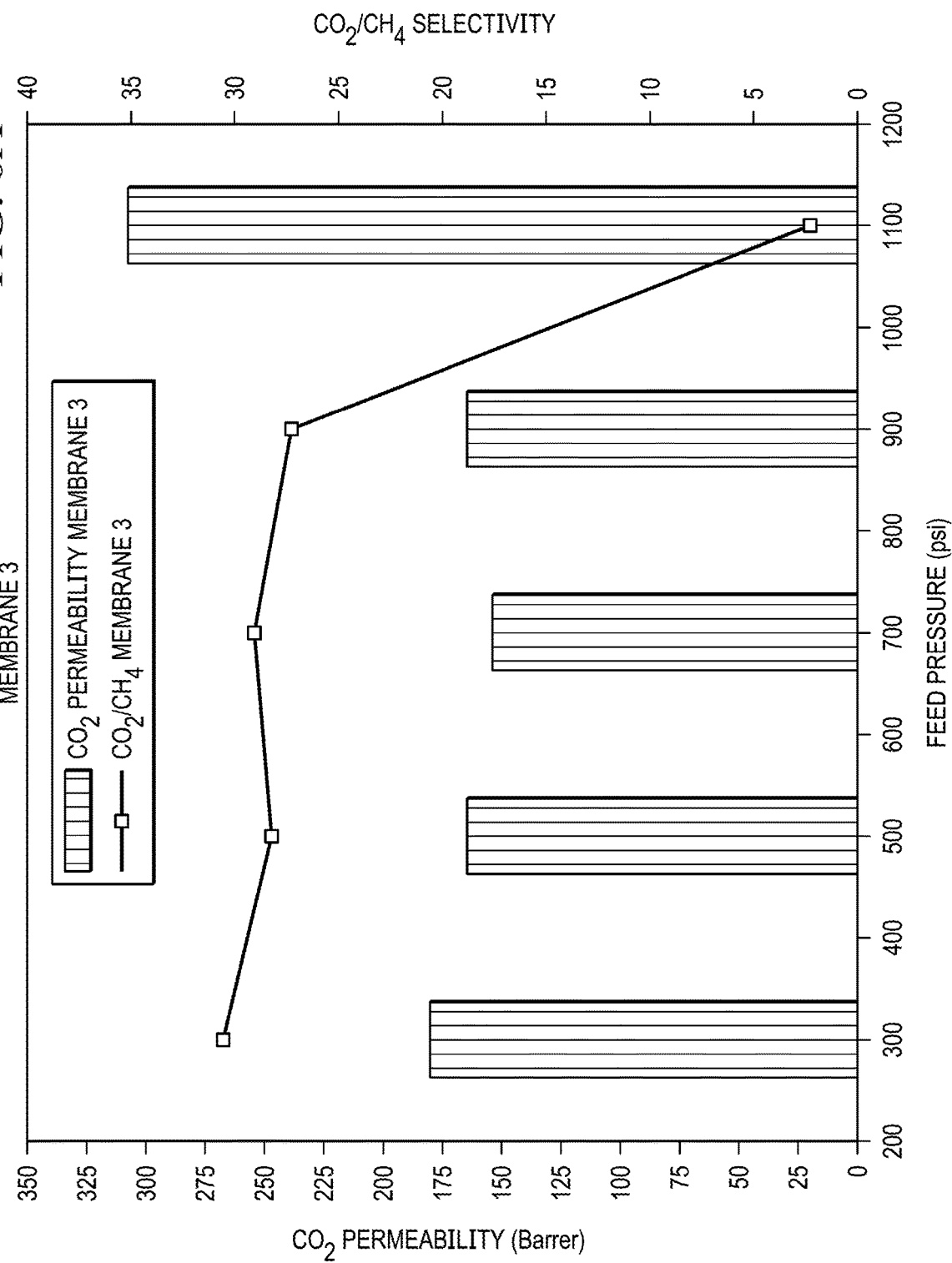

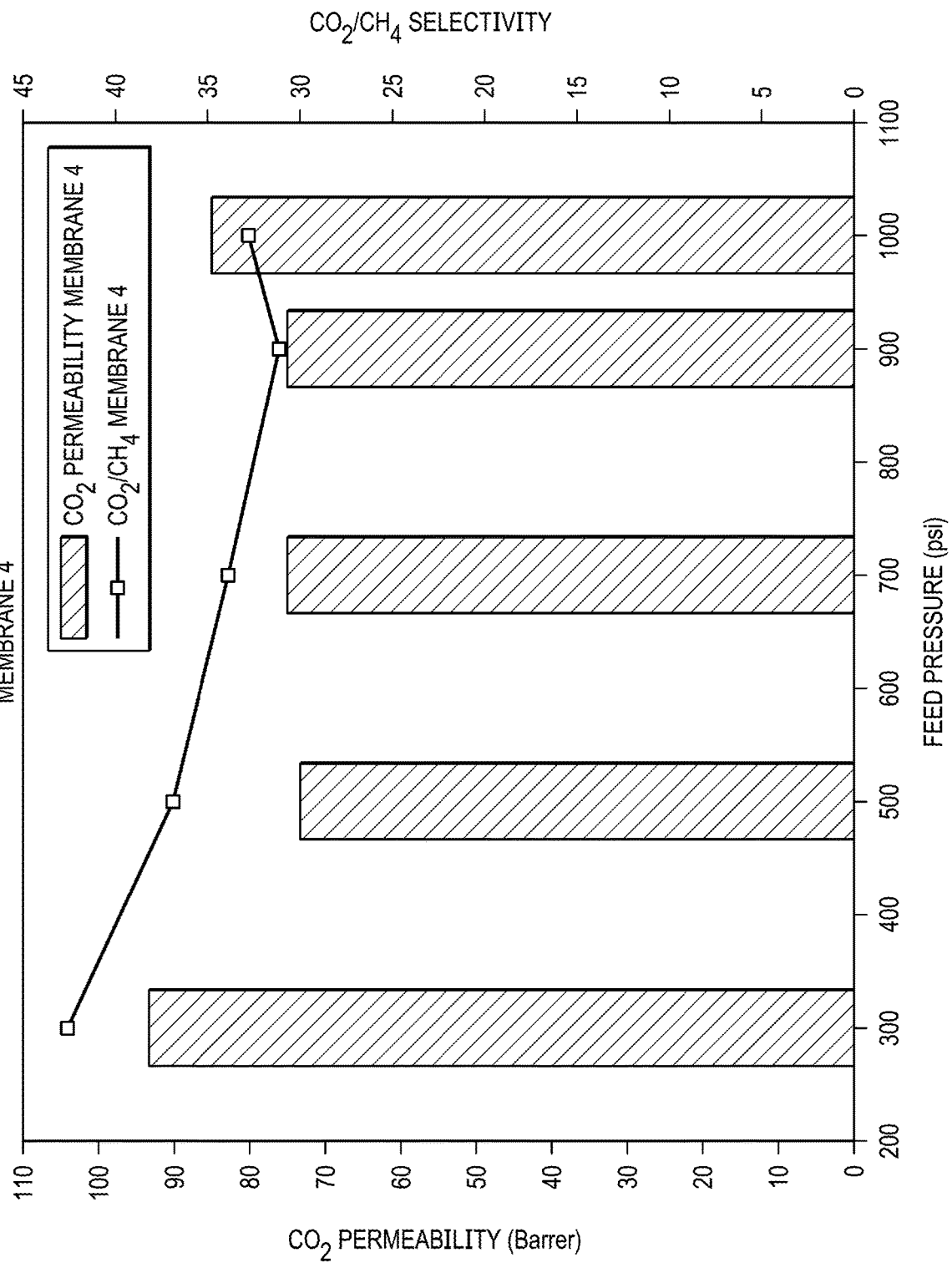

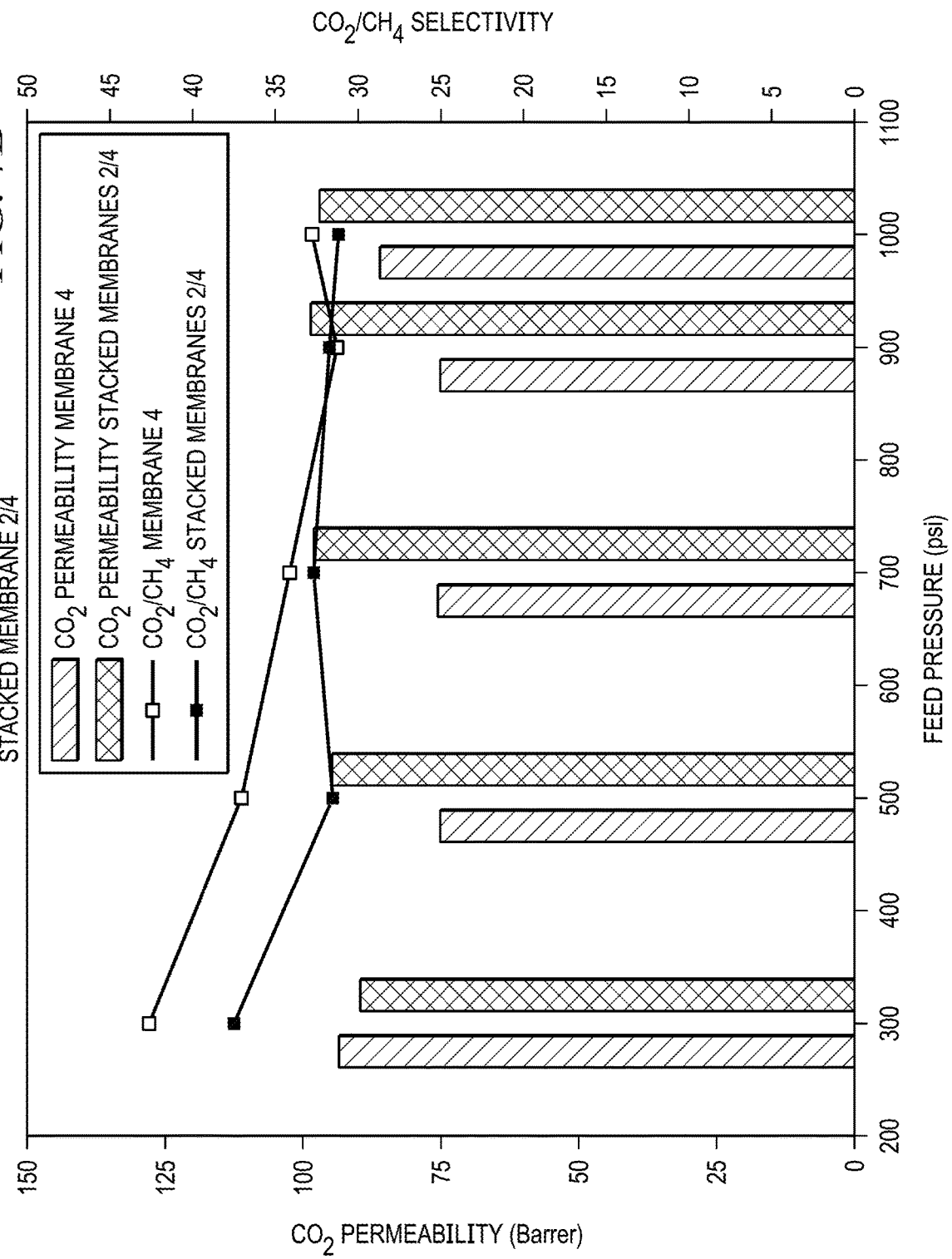

STACKED MEMBRANES AND THEIR USE IN GAS SEPARATION

FIELD

The disclosure relates to stacked membranes, such as stacked polymeric membranes, and their use in gas separation.

BACKGROUND

In general, membranes can selectively control mass transport and achieve separation between two fluid phases or environments. It is known to use polymeric membrane-based technology in gas separation processes.

SUMMARY

The disclosure relates to stacked membranes, such as stacked polymeric membranes, and their use in gas separation. The stacked membranes can reduce the total energy consumption during a gas purification process, such as a natural gas purification processes, which can substantially reduce the costs associated with such processes.

In some embodiments, a stacked membrane can be used to separate carbon dioxide and/or hydrogen sulfide from methane. Thus, a stacked membrane can be used to purify natural gas that contains carbon dioxide and/or hydrogen sulfide. In some embodiments, the stacked membrane exhibits improved permeation properties, and/or increased plasticization resistance, for example, during high pressure mixed-gas separation. In certain embodiments, the stacked membranes include two membranes formed of different polymeric materials. As an example, a stacked membrane can include a polymeric membrane with a relatively high carbon dioxide permeation rate and a moderate carbon dioxide/methane selectivity on a polymeric membrane with a relatively low carbon dioxide permeation rate and a relatively high carbon dioxide/methane selectivity. In such an example, the bottom membrane can be considered as an active selective layer, and the top membrane can be considered as a protecting layer. Such a stacked membrane has been found to exhibit overall improved permeation properties and plasticization resistance during mixed-gas separation, including at relatively high feed pressure.

This invention is not limited to the treatment of sweet mixed-gas streams, but it can also be applied to sour mixed-gas streams. The term sour means that the gas stream contains hydrogen sulfide (H2S), where membranes are prone to plasticization due to the high affinity of H2S molecules to polymeric materials due to the polar nature of H2S molecules.

The stacked membranes disclosed herein can be formed of materials other than polymeric materials, such as inorganic material (e.g., a glassy inorganic material or a rubbery inorganic material). Additionally or alternatively, a stacked membrane can include more than two layers, each of which is optionally formed of a different material (e.g., a different polymeric material or a different inorganic material).

In general, a stacked membrane as disclosed herein can exhibit improved gas separation performance, particularly for natural gas separations. In addition, the stacked membrane can exhibit enhanced resistance to plasticization at elevated operational conditions of pressure and temperature, e.g., during sweet mixed gas separation (a mixed gas containing methane and substantially no hydrogen sulfide) and sour mixed-gas separation (a mixed gas containing methane and hydrogen sulfide). Plasticization due to the presence of heavy hydrocarbons ($C_{2+}$) can also be reduced.

Stacked membranes disclosed here can reduce the cost (e.g., capital expenditure and/or operating expenditure) and/or increase the simplicity of gas separation processes, such as natural gas purification processes.

The disclosure demonstrates that a stacked membrane with a selective layer and a protecting layer can be provided such that the presence of the protecting layer improves the performance of the selective layer. Without wishing to be bound by theory, it is believed that the protecting layer allows the selective layer to work under higher gas feed pressures without being subject to plasticization. The protecting layer can act as a filter at a microscopic level to increase the concentration of the undesired impurities (e.g., carbon dioxide and/or hydrogen sulfide) in a gas mixture relative to one or more other gases in the gas mixture (e.g., methane) prior to reaching the selective layer, ultimately leading to an increase in their permeation rates.

In some embodiments, it is possible to tailor the performance of a stacked membrane to obtain a desired combination of properties by selecting an appropriate combination of materials for the protecting membrane and selective membrane, respectively. In certain embodiments, it is possible to utilize a material (e.g., for the selective layer) with relatively good permeation properties and/or relatively good selectivity properties, but relatively poor performance due to plasticization (e.g., at relatively high pressures), by selecting the appropriate counter material (e.g., protecting layer material) to reduce (e.g., prevent) plasticization from occurring during use of the stacked membrane.

In an embodiment, the disclosure provides a membrane system that includes a first membrane and a second membrane. At a temperature and pressure: the first membrane has a permeation rate for a first gas and a selectivity for a gas mixture that includes the first gas a second gas different from the first gas; the second membrane has a permeation rate for the first gas and a selectivity for the gas mixture; the permeation rate of the first membrane is greater than the permeation rate of the second membrane; and the selectivity of the second membrane is greater than the selectivity of the first membrane.

In some embodiments, the permeation rate of the first membrane is at least two times greater than the permeation rate of the second membrane.

In some embodiments, the selectivity of the second membrane is at least 1.5 times greater than the selectivity of the first membrane.

In some embodiments, the selectivity of the membrane system at a pressure of 1,100 psi is within 30% of the selectivity of the membrane system at a pressure of 500 psi.

In some embodiments, the selectivity of the membrane system at a pressure of 700 psi is within 30% of the selectivity of the membrane system at a pressure of 500 psi.

In some embodiments, the first membrane includes a first material, and the selectivity of the first material at 1,100 psi is more than 50% different from the selectivity of the first material at 500 psi.

In some embodiments, the first membrane includes a first material, and the selectivity of the first material at 700 psi is more than 50% different from the selectivity of the first material at 500 psi.

In some embodiments, the second membrane includes a second material, and the selectivity of the second material at 1,100 psi is more than 50% different from the selectivity of the second material at 500 psi.

In some embodiments, the second membrane includes a second material, and the selectivity of the second material at 700 psi is more than 50% different from the selectivity of the second material at 500 psi.

In some embodiments, the first gas is carbon dioxide or hydrogen sulfide, and the second gas is methane.

In some embodiments, the gas mixture further includes a third gas different from the first and second gases. The first membrane has a permeation rate for the third gas. The second membrane has a permeation rate for the third gas. The permeation rate of the first membrane for the third gas is greater than the permeation rate of the second membrane for the third gas. As an example, the first gas can carbon dioxide, the second gas can methane, and the third gas can be hydrogen sulfide.

In some embodiments, the article is a hollow fiber, or the article has a planar configuration.

In some embodiments, the first membrane includes a first material, and the second membrane includes a second material different from the first material. The first material includes a material selected from the group consisting of a polymer an inorganic material. The second material includes a material selected from the group consisting of a polymer and an inorganic material.

In some embodiments, the first membrane includes a first polymer, and the second membrane includes a second polymer different from the first polymer.

In some embodiments, the first material includes a polymer selected from polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenimidazoles, ladder polymers, and polymers with intrinsic microporosity.

In some embodiments, the second material includes a polymer selected from polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenimidazoles, ladder polymers, and polymers with intrinsic microporosity.

In some embodiments, the first material includes a polyimide, and the second material includes a polyimide.

In some embodiments, one of the first and second layers is coated on the other of the first and second layers.

In some embodiments, the membrane system further includes a third layer which is between the first and second layers.

In an aspect, the disclosure provides a gas separation system that includes a gas source configured to provide a mixture including a first gas and a second gas different from the first gas. The gas separation also includes a membrane system that includes a first membrane and a second membrane. At a temperature and pressure: the gas separation system is configured so that, during use of the gas separation system, the gas mixture contacts the first membrane before contacting the second membrane; the first membrane has a permeation rate for the first gas and a selectivity for the gas mixture gas; the second membrane has a permeation rate for the first gas and a selectivity for the gas mixture; the permeation rate of the first membrane is greater than the permeation rate of the second membrane; and the selectivity of the second membrane is greater than the selectivity of the first membrane.

In some embodiments, the gas source a natural gas source. The first gas is carbon dioxide or hydrogen sulfide, and the second gas is methane.

In an aspect, the disclosure provides a method of using a membrane system including first and second membranes to separate a first gas from a second gas. The method includes contacting a first gas mixture including the first and second gases with the first membrane of the membrane system so that a portion of each of the first and second gases in the initial gas mixture passes through the membrane system to provide a second gas mixture including the first and second gases. An amount of the first gas present in the second gas mixture is greater than an amount of the first gas present in the first gas mixture.

In some embodiments: the first membrane has a permeation rate for a first gas and a selectivity for a gas mixture including the first gas a second gas different from the first gas; the second membrane has a permeation rate for the first gas and a selectivity for the gas mixture; the permeation rate of the first membrane is greater than the permeation rate of the second membrane; and the selectivity of the second membrane is greater than the selectivity of the first membrane.

In some embodiments, the first gas includes carbon dioxide and/or hydrogen sulfide, and the second gas includes methane.

BRIEF DESCRIPTION OF THE DRAWINGS

FIGS. 3A and 3B are schematic views of hollow fiber stacked membranes.

FIGS. 5A and 5B show mixed-gas permeation properties of membranes.

FIGS. 6A and 6B show mixed-gas permeation properties of membranes.

FIGS. 7A and 7B show mixed-gas permeation properties of stacked membranes.

DETAILED DESCRIPTION

Figure 1B:
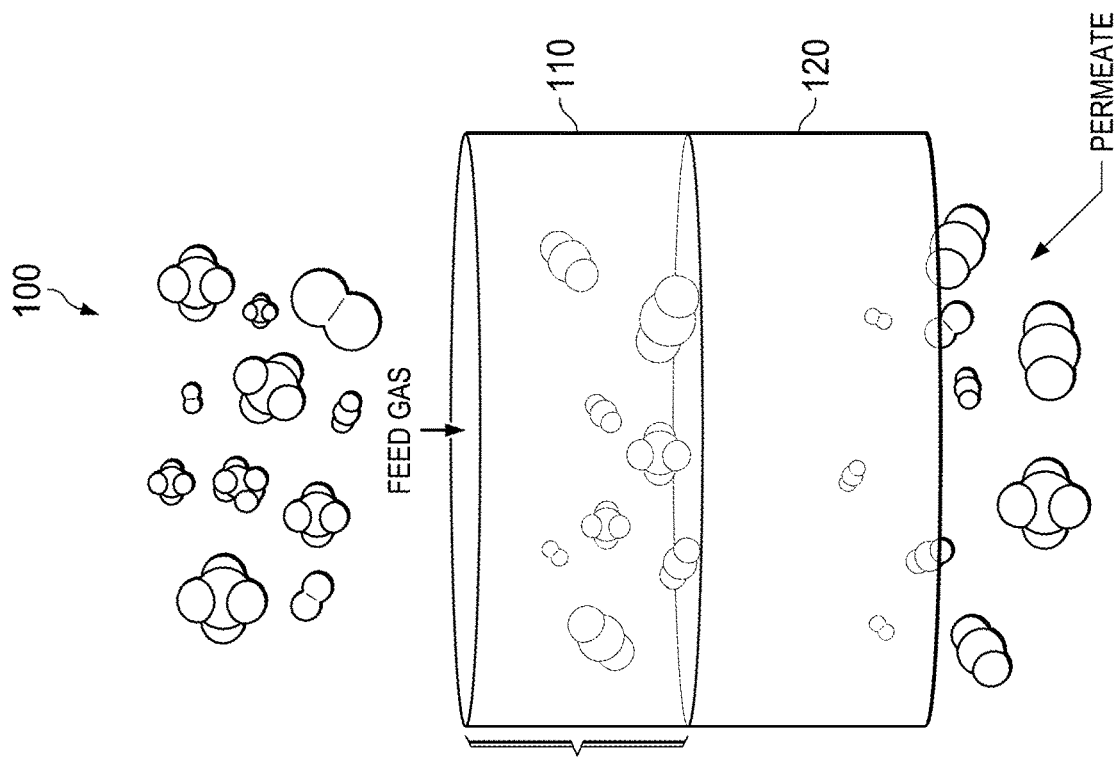
FIGS. 1A and 1B are schematic cross-sectional views of a planar stacked membrane.
Figure 1A:
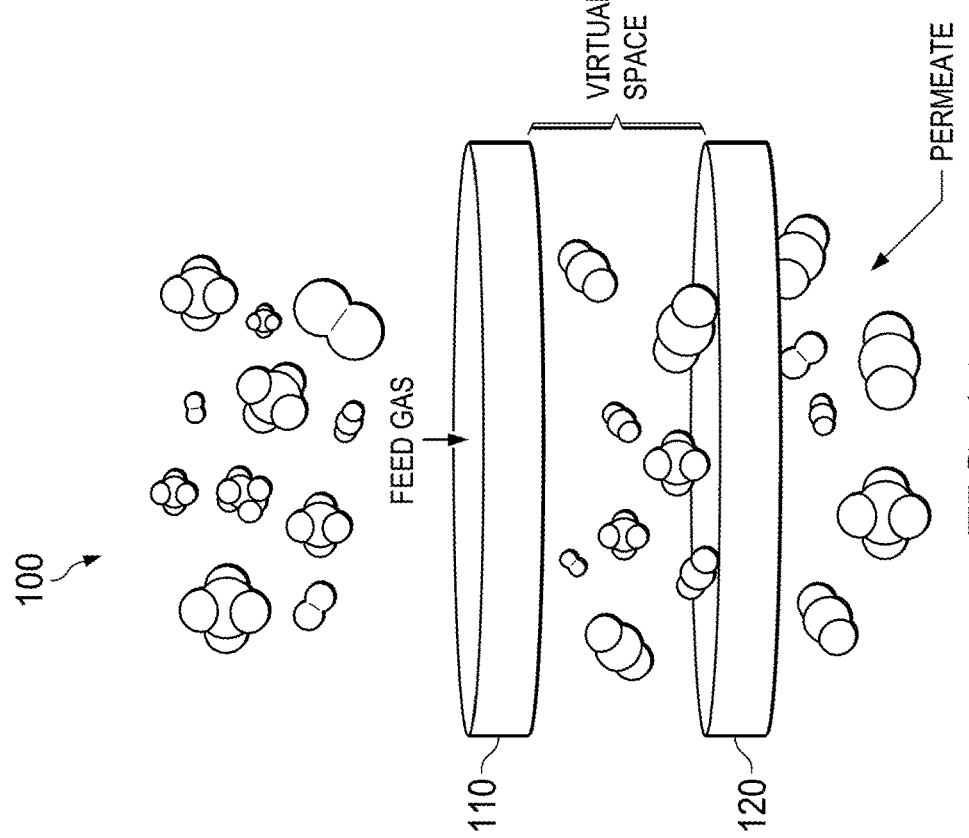

FIGS. 1A and 1B are schematic cross-sectional views of a planar stacked membrane 100 including a first membrane 110 stacked on a second membrane 120. Generally, and as depicted in FIGS. 1A and 1B, the membrane 110 is the membrane that is first contacted by a gas mixture containing a gas to be preferentially separated from the gas mixture, and the membrane 120 is subsequently contacted by a gas mixture that is modified due to the membrane 110. Thus, the membrane 110 is sometimes referred to as the top layer and/or the protecting layer, and the membrane 120 is sometimes referred to as the bottom layer and/or the selective layer. Also shown in FIGS. 1A and 1B are schematic representations of a feed gas containing nitrogen ($N_2$), carbon dioxide ($CO_2$) and methane ($CH_4$), as well as depictions of corresponding modified gas mixtures generated across the thickness of the stacked membrane 100. FIG. 1A shows a "virtual space" which is used to schematically depict the effect of the membranes 110 and 120 on the separation of gases present in the feed gas. FIG. 1B shows the membranes 110 and 120 with magnified thicknesses. Both FIGS. 1A and 1B demonstrate that, compared to the feed gas, the gas mixture that passes through the stacked membrane 100 has a relatively low concentration of methane and nitrogen and a relatively high concentration of carbon dioxide. In other words, the stacked membrane 100 is effective at selectively removing the carbon dioxide from the feed gas. Although not depicted in FIGS. 1A and 1B, the feed gas can also contain hydrogen sulfide (H2S). In such cases, the stacked membrane 100 can be used to preferentially separate hydrogen sulfide from the feed gas. In some embodiments, the stacked membrane can be used to preferentially separate both carbon dioxide and hydrogen sulfide from methane.

Generally, the thickness of the membrane 110 can be selected as appropriate. Typically, the thickness of the membrane 110 is chosen according to the intended application. In some embodiments, the membrane 110 is as thin as practical while maintaining sufficient chemical, physical and mechanical for its use. In certain embodiments, the membrane 110 has a thickness of at least 0.1 µm and/or at most 5 µm. In certain embodiments, the membrane 110 has a thickness of from 0.1 µm to 5 µm (e.g., from 0.1 µm to 5 µm, from 0.1 µm to 3 µm, from 0.1 µm to 1 µm, from 0.1 µm to 0.5 µm, from 0.1 µm to 0.3 µm).

In general, the membrane 110 can be formed of any appropriate material. In some embodiments, the membrane 110 can be formed of a polymer or an inorganic material. Examples of polymers include polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenimidazoles, ladder polymers, and polymers with intrinsic microporosity, as well as certain other aromatic polymers. Examples of polymers include 6FDA-Durene and 6FDA-DAM. In some embodiments, an inorganic material is a glassy inorganic materials or a rubbery inorganic material. Examples of inorganic materials include metal-organic frameworks (MOFs), zeolites, nanoparticles (e.g., silica, alumina, titania, zirconia, etc.), metals, alloys. In some cases, an inorganic material is a porous inorganic material. Optionally, an inorganic material can be dispersed within a polymeric matrix to form a mixed-matrix membrane (MMM).

Generally, compared to the membrane 120, the membrane 110 has a relatively high permeation rate for a gas (e.g., carbon dioxide or hydrogen sulfide) that is to be separated from the gas mixture (e.g., a gas mixture containing methane and the gas to be separated). As used herein, the permeation rate of a membrane for a gas is the pressure-normalized flux of the gas through the membrane, typically in units of GPU, where $1 \times 10^{-6}$ cm$^3$(STP)/(cm$^2 \cdot$s$\cdot$cmHg). In some embodiments, the membrane 110 has a permeation rate of at least 25 (e.g., at least 50 GPU, at least 75 GPU, at least 100 GPU). As an example, in some embodiments, the membrane 110 has a permeation rate of at least 25 GPU (e.g., at least 50 GPU, at least 75 GPU, at least 100 GPU) for carbon dioxide. As another example, in certain embodiments, the membrane 110 has a permeation rate of at least 25 GPU (e.g., at least 50 GPU, at least 75 GPU, at least 100 GPU) for hydrogen sulfide. As a further example, in some embodiments, the membrane 110 has a permeation rate of at least 25 GPU (e.g., at least 50 GPU, at least 75 GPU, at least 100 GPU) for carbon dioxide, and the membrane has a permeation rate of at least 25 GPU (e.g., at least 50 GPU, at least 75 GPU, at least 100 GPU) for hydrogen sulfide.

Generally, the membrane 110 has a moderate selectivity for the gas to be preferentially removed from the gas mixture/gas to be preferentially maintained in the gas mixture (e.g., carbon dioxide/methane or hydrogen sulfide/methane). As used herein, the selectivity of a membrane for a given pair of gases is the ratio the amount of one of the gases in the pair of gases which permeates the membrane under a set of conditions (e.g., temperature and pressure) to the amount of the other gas of the pair of gases which permeates the membrane under the same set of conditions. As an example, the selectivity of a membrane for a gas mixture of carbon dioxide/methane is the ratio of the permeability of the membrane for carbon dioxide to the permeability of the membrane for methane. As another example, the selectivity of a membrane for hydrogen sulfide/methane is the ratio of the permeability of the membrane for hydrogen sulfide to the permeability of the membrane for methane. Typically, this selectivity for the membrane 110 is less than that of the membrane 120. In some embodiments, the membrane 110 has a selectivity for carbon dioxide/methane that is at least 5 (e.g., at least 15, at least 20) but less than the selectivity of carbon dioxide/methane of the membrane 120. In certain embodiments, the membrane 110 has a selectivity for hydrogen sulfide/methane that is at least 5 (e.g., at least 15, at least 20) but less than the selectivity of hydrogen sulfide/methane of the membrane 120. In some embodiments, the membrane 110 has a selectivity for carbon dioxide/methane that is at least 5 (e.g., at least 15, at least 20) but less than the selectivity of carbon dioxide/methane of the membrane 120, and the membrane 110 has a selectivity for hydrogen sulfide/methane that is at least 5 (e.g., at least 15, at least 20) but less than the selectivity of hydrogen sulfide/methane of the membrane 120.

Generally, the thickness of the membrane 120 can be selected as appropriate. Typically, the thickness of the membrane 120 is chosen according to the intended application. In some embodiments, the membrane 120 is as thin as practical while maintaining sufficient chemical, physical and mechanical for its use. In certain embodiments, the membrane 120 has a thickness of at least 0.1 µm and/or at most 5 µm. In certain embodiments, the membrane 120 has a thickness of from 0.1 µm to 5 µm (e.g., from 0.1 µm to 5 µm, from 0.1 µm to 3 µm, from 0.1 µm to 1 µm, from 0.1 µm to 0.5 µm, from 0.1 µm to 0.3 µm).

In general, the membrane 120 can be formed of any appropriate material, but, as a general matter, the membrane 120 is made of a material that is different from the material from which the membrane 110 is made. In some embodiments, the membrane 120 can be formed of a polymer or an inorganic material. Examples of polymers include polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenimidazoles, ladder polymers, and polymers with intrinsic microporosity, as well as certain other aromatic polymers. Examples of polymers include 6FDA-Durene/BAO (e.g., 6FDA-Durene/BAO (1:1)) and 6FDA-Durene/BAT(Ph) (e.g., 6FDA-Durene/BAT(Ph) (3:1)). In some embodiments, an inorganic material is a glassy inorganic materials or a rubbery inorganic material. Examples of inorganic materials include metal-organic frameworks (MOFs), zeolites, nanoparticles (e.g., silica, alumina, titania, zirconia, etc.), metals, alloys. In some cases, an inorganic material is a porous inorganic material. Optionally, an inorganic material can be dispersed within a polymeric matrix to form a mixed-matrix membrane (MMM).

In general, compared to the membrane 110, the membrane 120 has a relatively low permeation rate for a gas (e.g., carbon dioxide or hydrogen sulfide) that is to be separated from the gas mixture (e.g., a gas mixture containing methane and the gas to be separated). In some embodiments, the membrane 110 has a permeation rate of at most 25 (e.g., at most 15 GPU, at most 10) for the gas to be preferentially separated. As an example, in some embodiments, the membrane 110 has a permeation rate of at most 25 (e.g., at most 15 GPU, at most 10) for carbon dioxide. As another example, in certain embodiments, the membrane 110 has a permeation rate of at most 25 (e.g., at most 15 GPU, at most 10) for hydrogen sulfide. As a further example, in some embodiments, the membrane 110 has a permeation rate of at most 25 (e.g., at most 15 GPU, at most 10) for carbon dioxide, and the membrane has a permeation rate of at most 25 (e.g., at most 15 GPU, at most 10) for hydrogen sulfide.

Generally, compared to the membrane 110, the membrane 120 has a relatively high selectivity for the gas to be preferentially removed from the gas mixture/gas to be preferentially maintained in the gas mixture (e.g., carbon dioxide/methane or hydrogen sulfide/methane). In some embodiments, the membrane 120 has a selectivity for carbon dioxide/methane that is at least 15 (e.g., at least 20, at least 25, at least 30). In certain embodiments, the membrane 120 has a selectivity for hydrogen sulfide/methane that is at least 15 (e.g., at least 20, at least 25, at least 30). In some embodiments, the membrane 120 has a selectivity for carbon dioxide/methane that is at least 15 (e.g., at least 20, at least 25, at least 30), and the membrane 120 has a selectivity for hydrogen sulfide/methane that is at least 15 (e.g., at least 20, at least 25, at least 30).

In general, the membrane 110 has a higher permeation rate for a gas to be separated from the gas mixture than does the membrane 120. In some embodiments, the membrane 110 has a permeation rate for a gas to be separated from the gas mixture that is at least two times (e.g., at least four times, at least seven times, at least 10 times) greater than that of the membrane 120. As an example, in certain embodiments, the membrane 110 has a permeation rate for carbon dioxide that is at least two times (e.g., at least four times, at least seven times, at least 10 times) greater than the permeation rate for carbon dioxide of the membrane 120. As another example, in some embodiments, the membrane 110 has a permeation rate for hydrogen sulfide that is at least two times (e.g., at least four times, at least seven times, at least 10 times) greater than the permeation rate for hydrogen sulfide of the membrane 120. As a further example, in certain embodiments, the membrane 110 has a permeation rate for carbon dioxide that is at least two times (e.g., at least four times, at least seven times, at least 10 times) greater than the permeation rate for carbon dioxide of the membrane 120, and the membrane 110 has a permeation rate for hydrogen sulfide that is at least two times (e.g., at least four times, at least seven times, at least 10 times) greater than the permeation rate for hydrogen sulfide of the membrane 120.

Generally, the membrane 120 has a higher selectivity for the gas to be preferentially removed from the gas mixture/gas to be preferentially maintained in the gas mixture (e.g., carbon dioxide/methane or hydrogen sulfide/methane). In some embodiments, the membrane 120 has a selectivity for carbon dioxide/methane that is at least 1.5 times (e.g., at least 2 times, at least 5 times) greater than the selectivity of carbon dioxide/methane of the membrane 110. In certain embodiments, the membrane 120 has a selectivity for hydrogen sulfide/methane that is at least 1.5 times (e.g., at least 2 times, at least 5 times) greater than the selectivity of hydrogen sulfide/methane of the membrane 110. In some embodiments, the membrane 120 has a selectivity for carbon dioxide/methane that is at least 1.5 times (e.g., at least 2 times, at least 5 times) greater than the selectivity of carbon dioxide/methane of the membrane 110, and the membrane 120 has a selectivity for hydrogen sulfide/methane that is at least 1.5 times (e.g., at least 2 times, at least 5 times) greater than the selectivity of hydrogen sulfide/methane of the membrane 110.

In general, the stacked membrane 100 undergoes relatively little plasticization. In some embodiments, the stacked membrane 100 undergoes relatively little or no change in selectivity when the operating conditions undergo a substantial increase in pressure. In certain embodiments, the stacked membrane 100 has a selectivity for a gas of a pair of gases at a pressure of 1,100 psi that is within 30% of the selectivity of the membrane system at a pressure of 500 psi. In some embodiments, the stacked membrane 100 has a selectivity for carbon dioxide/methane at a pressure of 1,100 psi that is within 30% of the selectivity for carbon dioxide/methane of the stacked membrane 100 at a pressure of 500 psi. In certain embodiments, the stacked membrane 100 has a selectivity for hydrogen sulfide/methane at a pressure of 1,100 psi that is within 30% of the selectivity for hydrogen sulfide/methane of the stacked membrane 100 at a pressure of 500 psi. In some embodiments, the stacked membrane 100 has a selectivity for carbon dioxide/methane at a pressure of 1,100 psi that is within 30% of the selectivity for carbon dioxide/methane of the stacked membrane 100 at a pressure of 500 psi, and the stacked membrane 100 has a selectivity for hydrogen sulfide/methane at a pressure of 1,100 psi that is within 30% of the selectivity for hydrogen sulfide/methane of the stacked membrane 100 at a pressure of 500 psi. In certain embodiments, the stacked membrane 100 has a selectivity for a gas of a pair of gases at a pressure of 700 psi that is within 30% of the selectivity of the membrane system at a pressure of 500 psi. In some embodiments, the stacked membrane 100 has a selectivity for carbon dioxide/methane at a pressure of 700 psi that is within 30% of the selectivity for carbon dioxide/methane of the stacked membrane 100 at a pressure of 500 psi. In certain embodiments, the stacked membrane 100 has a selectivity for hydrogen sulfide/methane at a pressure of 700 psi that is within 30% of the selectivity for hydrogen sulfide/methane of the stacked membrane 100 at a pressure of 500 psi. In some embodiments, the stacked membrane 100 has a selectivity for carbon dioxide/methane at a pressure of 700 psi that is within 30% of the selectivity for carbon dioxide/methane of the stacked membrane 100 at a pressure of 500 psi, and the stacked membrane 100 has a selectivity for hydrogen sulfide/methane at a pressure of 700 psi that is within 30% of the selectivity for hydrogen sulfide/methane of the stacked membrane 100 at a pressure of 500 psi.

Even though the stacked membrane 100 can exhibit relatively little plasticization, the stacked membrane can include a membrane (e.g., the membrane 110) that is made of a material that on its own does undergo substantial plasticization. In some embodiments, while the stacked membrane 100 exhibits the properties noted in the preceding paragraph, the membrane 110 is made of a material that has a selectivity (e.g., of carbon dioxide/methane and/or of hydrogen sulfide/methane) at 1,100 psi that is more than 50% (e.g., more than 60%, more than 70%) different from the selectivity of the first at 500 psi. In certain embodiments, while the stacked membrane 100 exhibits the properties noted in the preceding paragraph, the membrane 110 is made of a material that has a selectivity (e.g., of carbon dioxide/methane and/or of hydrogen sulfide/methane) at 700 psi that is more than 50% (e.g., more than 60%, more than 70%) different from the selectivity of the first at 500 psi.

Even though the stacked membrane 100 can exhibit relatively little plasticization, the stacked membrane can include a membrane (e.g., the membrane 120) that is made of a material that on its own does undergo substantial plasticization. In some embodiments, while the stacked membrane 100 exhibits the properties noted in the preceding paragraph, the membrane 120 is made of a material that has a selectivity (e.g., of carbon dioxide/methane and/or of hydrogen sulfide/methane) at 1,100 psi that is more than 50% (e.g., more than 60%, more than 70%) different from the selectivity of the first at 500 psi. In certain embodiments, while the stacked membrane 100 exhibits the properties noted in the preceding paragraph, the membrane 120 is made of a material that has a selectivity (e.g., of carbon dioxide/methane and/or of hydrogen sulfide/methane) at 700 psi that is more than 50% (e.g., more than 60%, more than 70%) different from the selectivity of the first at 500 psi.

In general, the membrane 110 and the membrane 120 can be joined in any appropriate manner, including, for example, via chemical bonding and/or physical force. In some embodiments, one of the two membrane is deposited onto the other membrane. For such embodiments, any appropriate approach may be used. As an example, one of the membranes can be coated onto the other via solution deposition (e.g., using an organic solvent). In some embodiments, dip coating, and/or spin coating can be used. In such a process, in general, the solvent used to deposit the membrane should have a relatively low solubility for the material that forms the other membrane. In some embodiments, the solution is DMF or chloroform. Alternatively or additionally, one membrane can be deposited onto the other membrane using other approaches, such as interfacial polymerization, plasma coating, physical vapor deposition, and/or chemical vapor decomposition. In some embodiments, it is possible that the coating process can result in defects in one of the membranes (e.g., the membrane 120) the deposited layer. Optionally, to seal (or block) such defects, an additional process (e.g., an additional caulking process) can be used. In such cases, the additional process should not result in a substantial change in the permeation and separation properties of the membrane.

Figure 2B:
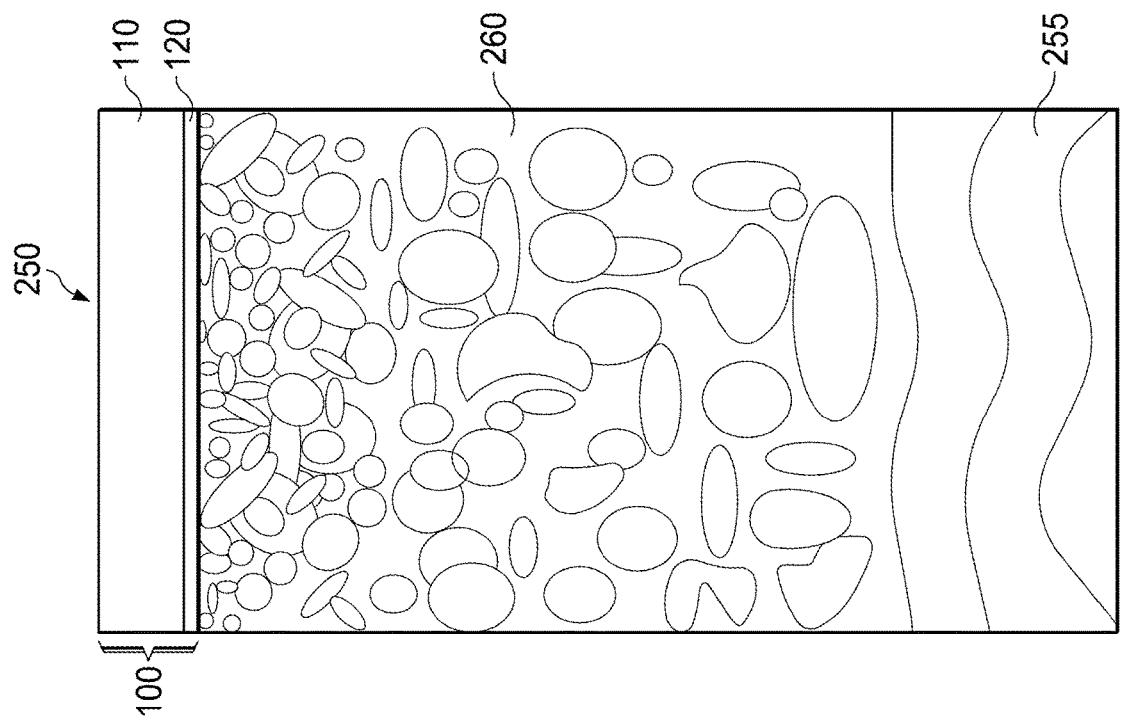
FIGS. 2A and 2B are schematic cross-section views of planar stacked membranes.
Figure 2A:
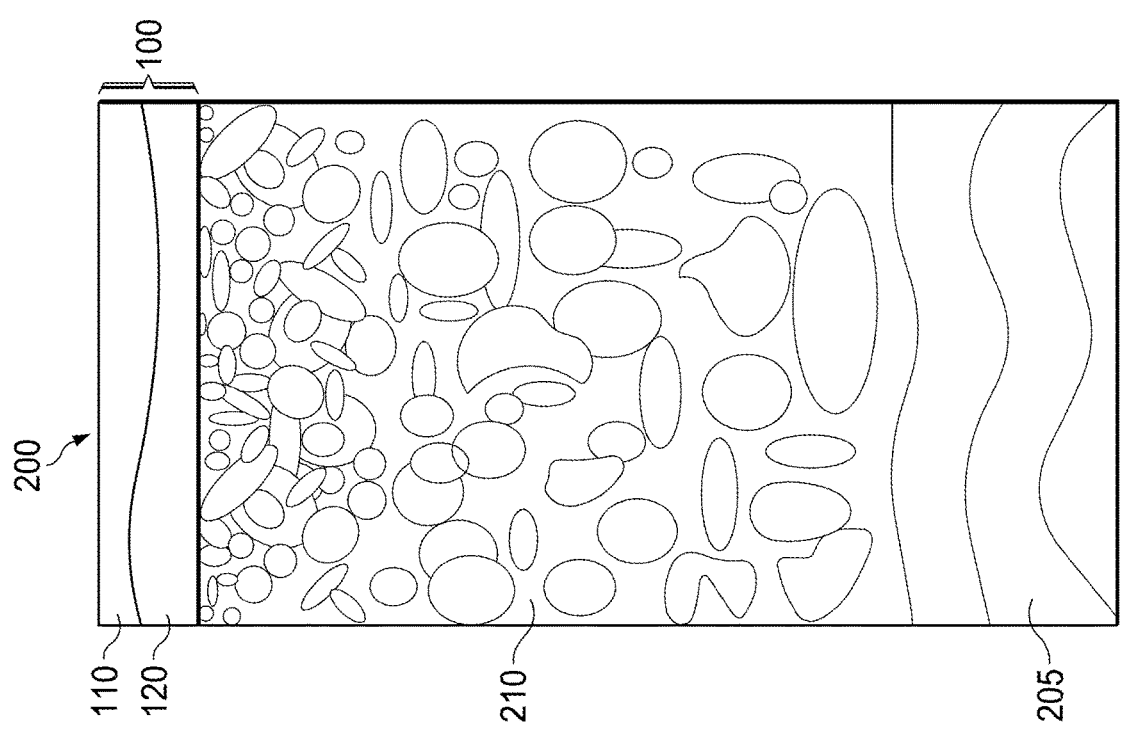

FIG. 2A schematically depicts a stacked membrane 200. The stacked membrane 200 includes a backing layer 205 (e.g., a woven fabric or a non-woven fabric), a porous membrane support layer 210 (e.g., an ultrafiltration membrane or a microfiltration membrane), the membrane 120, and the membrane 110. The layer 205 and the layer 210 can be provided via commercially available flat sheet membranes that have two (or, optionally) more layers of different materials. Such commercially available membranes are commonly formed by using a phase inversion process to form the porous support 210 on the woven or non-woven fabric layer 205. The membrane 120 can be coated on the support 210, followed by formation of the membrane 110 on the membrane 120. In some embodiments, a two-step coating process is used to provide the membrane 120 and the membrane 110. The stacked membrane 200 can exhibit the properties noted above for the stacked membrane 100.

FIG. 2B schematically depicts a stacked membrane 250. The stacked membrane 250 includes a backing layer 255 (e.g., a woven fabric or a non-woven fabric), an integrally skinned asymmetric membrane 260, the membrane 120, and the membrane 110. The layer 255 and the membrane 260 are commercially available. Such combinations can be formed using a phase inversion technique to form the membrane 260 on the layer 255. The membrane 120 can be coated on the membrane 260, followed by formation of the membrane 110 on the membrane 120. In some embodiments, a two-step coating process is used to provide the membrane 120 and the membrane 110. The stacked membrane 250 can exhibit the properties noted above for the stacked membrane 100.

In some embodiments, a method of making a planar geometry stacked membrane (e.g., as shown in FIGS. 1A, 1B, 2A and/or 2B) can be relatively easily accommodated into existing infrastructure with little or no modification to the infrastructure or via a relatively simple additional process for coating. In certain embodiments, facilities to fabricate the stacked membrane can be fully utilized without any changes.

While planar stacked membranes have been described, the disclosure is not limited to stacked membranes having this shape. In general, a stacked membrane can have any shape appropriate for its intended use. FIG. 3A schematically shows a hollow fiber stacked membrane 300 having a protecting layer 310 on a selective layer 320. The feed gas contacts the protecting layer 310, and a permeate gas mixture exits the stacked membrane 300 via its hollow interior 330. In general, the dimensions of the hollow fiber stacked membrane 300 can be selected as appropriate for its intended use. In some embodiments, the outer diameter of the hollow fiber stacked membrane 300 is from 80 μm to 1 mm. In certain embodiments, the ratio of the outer diameter of the membrane 300 to the inner diameter of the membrane 300 is from 1.2 to 3 (e.g., depending on the operating pressure). In some embodiments, for relatively high operating pressures, such as used in natural gas processes, the outer diameter of the hollow fiber stacked membrane 300 is from 80 μm to 500 μm, and/or the ratio of the outer diameter of the membrane 300 to the inner diameter of the membrane 300 is from 1.8 to 2.5. The hollow fiber stacked membrane 300 can have properties as described for the stacked membrane 100. The membrane 310 can have properties as described above for membrane 110. The membrane 300 can have properties as described above for membrane 100.

FIG. 3B schematically shows a hollow fiber stacked membrane 350 in which the selective layer 320 is on the protecting layer 310. The feed gas enters the interior 360 of the stacked membrane 350 and contacts the protecting layer 310, and the permeate gas mixture exits the stacked membrane 350 after passing through the protecting layer 310 and the selective layer 320. The hollow fiber stacked membrane 350 can have properties as described for the stacked membrane 100. The membrane 310 can have properties as described above for membrane 110. The membrane 320 can have properties as described above for membrane 100.

EXAMPLES

Membrane Preparation
Membrane 1 (6FDA-Durene)

In a 100-ml three-neck round bottom flask equipped with a nitrogen inlet and a mechanical stirrer, 2,3,5,6-tetramethylbenzene-1,4-diamine (5.000 g, 30.4 mmol) (Durene) and 5,5'-(perfluoropropane-2,2-diyl)bis(isobenzofuran-1,3-dione) (13.52 g, 30.4 mmol) (6FDA) were added to the reaction vessel followed by m-cresol (40.00 ml). The mixture was heated at 180° C. for 8 hours. The heat was removed and the reaction mixture was allowed to cool down below 100° C., then the resulting highly viscous solution was poured into methanol in thin fibers. The fibrous polymer obtained was ground, rinsed with methanol several times (at least 4 times), filtered and dried under reduced pressure for 24 h at 60° C. to afford 6FDA-Durene (17.3 g, 28.7 mmol, 94% yield) as a white powder.

The reaction is represented by:

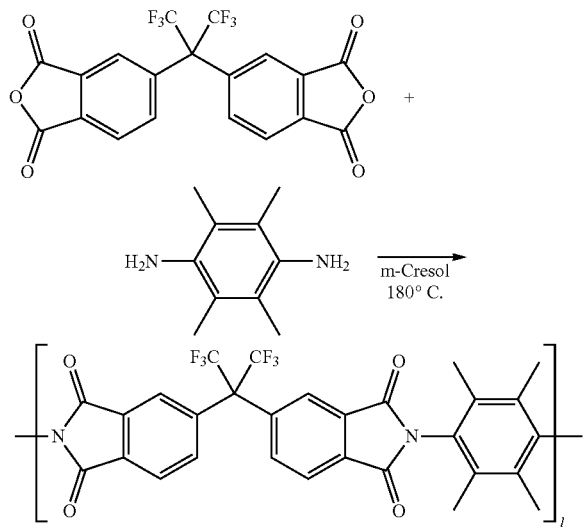

Membrane 1 had the Chemical Structure:

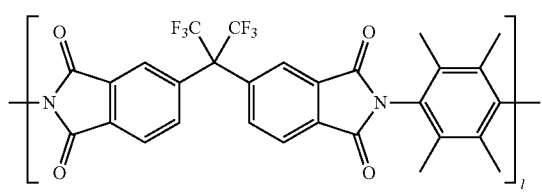

A dense membrane with a thickness of 50-150 μm was prepared by casting a 3 wt. % solution of the prepared polyimide in DMF onto glass Petri dish. Beforehand the solutions were filtered using a 0.45 μm PTFE filter to remove undissolved polymer material or impurities. The cast solution was left at room temperature under a glass lid (or in an oven at 70° C.) for 24 hours for slow solvent evaporation. The membrane thus formed was heated at 60° C. for 24 hours under nitrogen flow. The drying temperature was raised to 150° C. and dried under vacuum for 24 hours. Finally, to peel off the membrane from the Petri dishes, the membrane was soaked in deionized water for 15 minutes and then dried at 60° C. in a vacuum oven for 6 hours to remove water.

Membrane 2 [6FDA-DAM]

In a 100-mL three-neck round bottom flask equipped with a nitrogen inlet and a mechanical stirrer, 2,4,6-trimethylbenzene-1,3-diamine (DAM, 2.000 g, 13.31 mmol) and 5,5'-(perfluoropropane-2,2-diyl)bis(isobenzofuran-1,3-dione) (6FDA, 5.91 g, 13.31 mmol) were dissolved in m-cresol (32.0 ml). The mixture was heated at 180° C. for 8 hours. The solution was diluted with additional 10 mL of m-cresol while still hot, and the resulting viscous solution was poured into methanol. The fibrous polymer obtained was stirred in methanol overnight, then filtered and dried partially. The solid polymer was washed twice (2×400 mL) with methanol over two days. The final product 6FDA-DAM (7.4 g, 12.57 mmol, 94% yield) was filtered off then dried under reduced pressure at 150° C. for two days to afford a white solid.

The reaction is represented by:

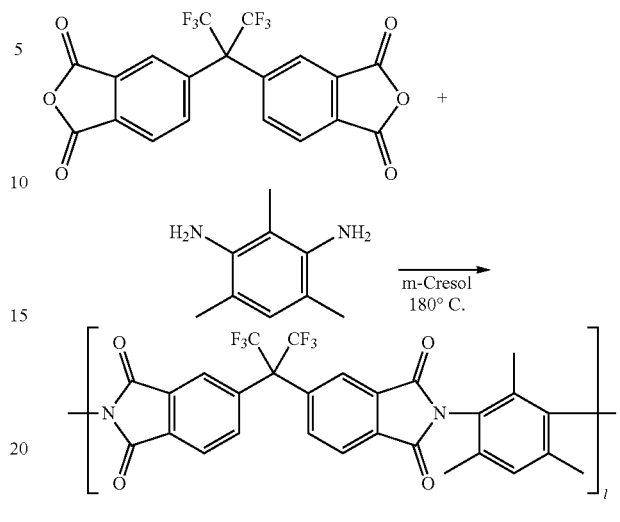

Membrane 2 had the Chemical Structure:

A dense membrane with a thickness of 50-150 μm was prepared by casting a 3 wt. % solution of the prepared polyimide in DMF onto glass Petri dish. Beforehand the solutions were filtered using a 0.45 μm PTFE filter to remove undissolved polymer material or impurities. The cast solution was left at room temperature under a glass lid (or in an oven at 70° C.) for 24 hours for slow solvent evaporation. The membrane thus formed was heated at 60° C. for 24 hours under nitrogen flow. The drying temperature was raised to 150° C. and dried under vacuum for 24 hours. Finally, to peel off the membrane from the Petri dishes, the membrane was soaked in deionized water for 15 minutes and then dried at 60° C. in a vacuum oven for 6 hours to remove water.

Membrane 3 [6FDA-Durene BAO (1:1)]

In a 100-ml three-neck round bottom flask equipped with a nitrogen inlet and a mechanical stirrer, 2,3,5,6-tetramethylbenzene-1,4-diamine (0.326 g, 1.982 mmol) (Durene), 4,4'-(1,3,4-oxadiazole-2,5-diyl)dianiline (0.500 g, 1.982 mmol) (BAO) and 5,5'-(perfluoropropane-2,2-diyl)bis(isobenzofuran-1,3-dione) (1.761 g, 3.96 mmol) (6FDA) were added to the reaction vessel followed by NMP (12.00 ml) and 5% LiCl (0.600 g). The mixture was heated at 200° C. for 8 hours. The heat was removed and the reaction mixture was allowed to cool down below 100° C., then the resulting highly viscous solution was poured into water in thin fibers. The fibrous polymer obtained was ground, rinsed with water, filtered and dried under reduced pressure for 24 h at 60° ° C. to afford 6FDA-Durene/BAO (1:1) (2.378 g, 1.883 mmol, 95% yield) as a white off powder.

The reaction is represented by:

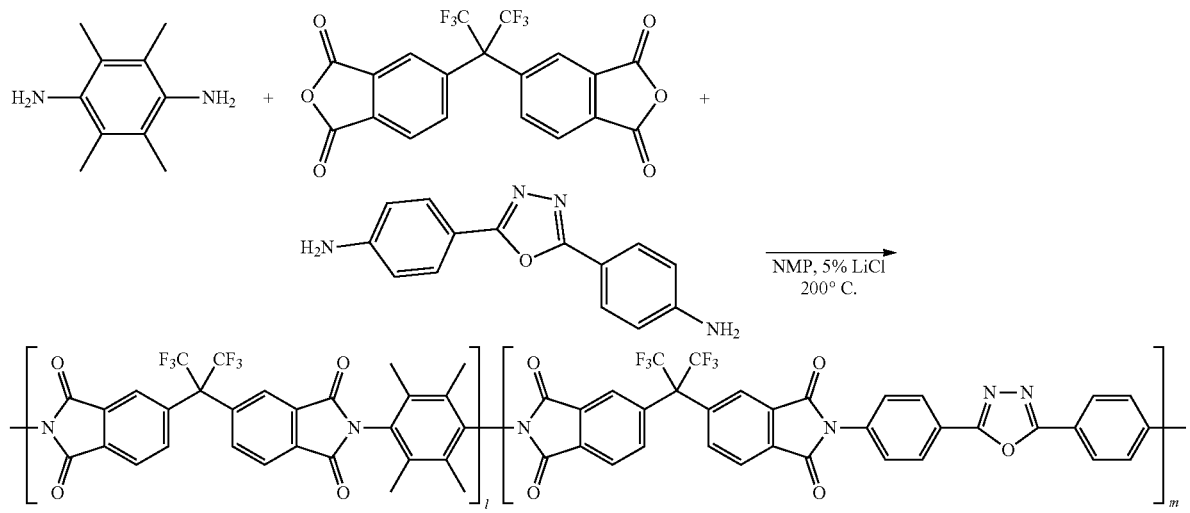

Membrane 3 had the Chemical Structure:

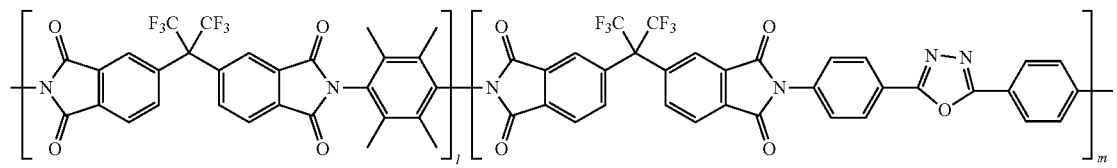

A dense membrane with a thickness of 50-150 μm was prepared by casting a 3 wt. % solution of the prepared polyimide in DMF onto glass Petri dish. Beforehand the solutions were filtered using a 0.45 μm PTFE filter to remove undissolved polymer material or impurities. The cast solution was left at room temperature under a glass lid (or in an oven at 70° C.) for 24 hours for slow solvent evaporation. The membrane thus formed was heated at 60° ° C. for 24 hours under nitrogen flow. The drying temperature was raised to 150° C. and dried under vacuum for 24 hours. Finally, to peel off the membrane from the Petri dishes, the membrane was soaked in deionized water for 15 minutes and then dried at 60° C. in a vacuum oven for 6 hours to remove water.

Membrane 4 [6FDA-Durene BAT(Ph) (3:1)]

In a 100-ml three-neck round bottom flask equipped with a nitrogen inlet and a magnetic bar, 5,5'-(perfluoropropane-2,2-diyl)bis(isobenzofuran-1,3-dione) (6FDA, 1.357 g, 3.05 mmol), 2,3,5,6-tetramethylbenzene-1,4-diamine (Durene, 0.376 g, 2.291 mmol), and 4,4'-(4-phenyl-4H-1,2,4-triazole-3,5-diyl)dianiline [BAT(Ph), 0.250 g, 0.764 mmol] were introduced and dissolved in NMP (20.0 ml). The reaction mixture was stirred at room temperature for 24 hours. Later, 2.0 mL of pyridine and 6.0 mL of acetic anhydride were added and the reaction mixture was maintained at 125° C. for an additional 8 hours. The reaction mixture was cooled down and the polymer was precipitated in methanol (100 mL). The solid was washed several times with methanol to remove the residual solvents to yield the product 6FDA-Durene/BAT(Ph) (3:1) (1.941 g, 1.451 mmol, 95% yield) as a brown powder.

Membrane 4 had the Chemical Structure:

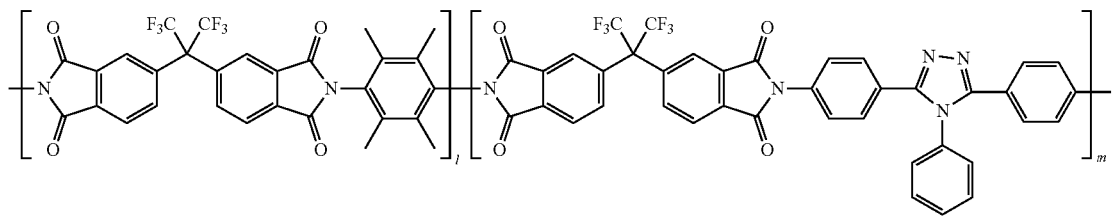

A dense membrane with a thickness of 50-150 μm was prepared by casting a 3 wt. % solution of the prepared polyimide in DMF onto glass Petri dish. Beforehand the solutions were filtered using a 0.45 μm PTFE filter to remove undissolved polymer material or impurities. The cast solution was left at room temperature under a glass lid (or in an oven at 70° C.) for 24 hours for slow solvent evaporation. The membrane thus formed was heated at 60° C. for 24 hours under nitrogen flow. The drying temperature was raised to 150° C. and dried under vacuum for 24 hours. Finally, to peel off the membrane from the Petri dishes, the membrane was soaked in deionized water for 15 minutes and then dried at 60° C. in a vacuum oven for 6 hours to remove water.

Membrane Evaluation

Mixed-gas permeation data of individual membranes and stacked membranes were measured using a constant-pressure permeation system using a gas mixture prepared from methane ($CH_4$), nitrogen ($N_2$), ethane ($C_2H_6$), and carbon dioxide ($CO_2$) with a composition of 59, 30, 1, and 10 vol. %, respectively, under various feed pressures up to 1,100 psi and a temperature of 22° C.

Figure 4:
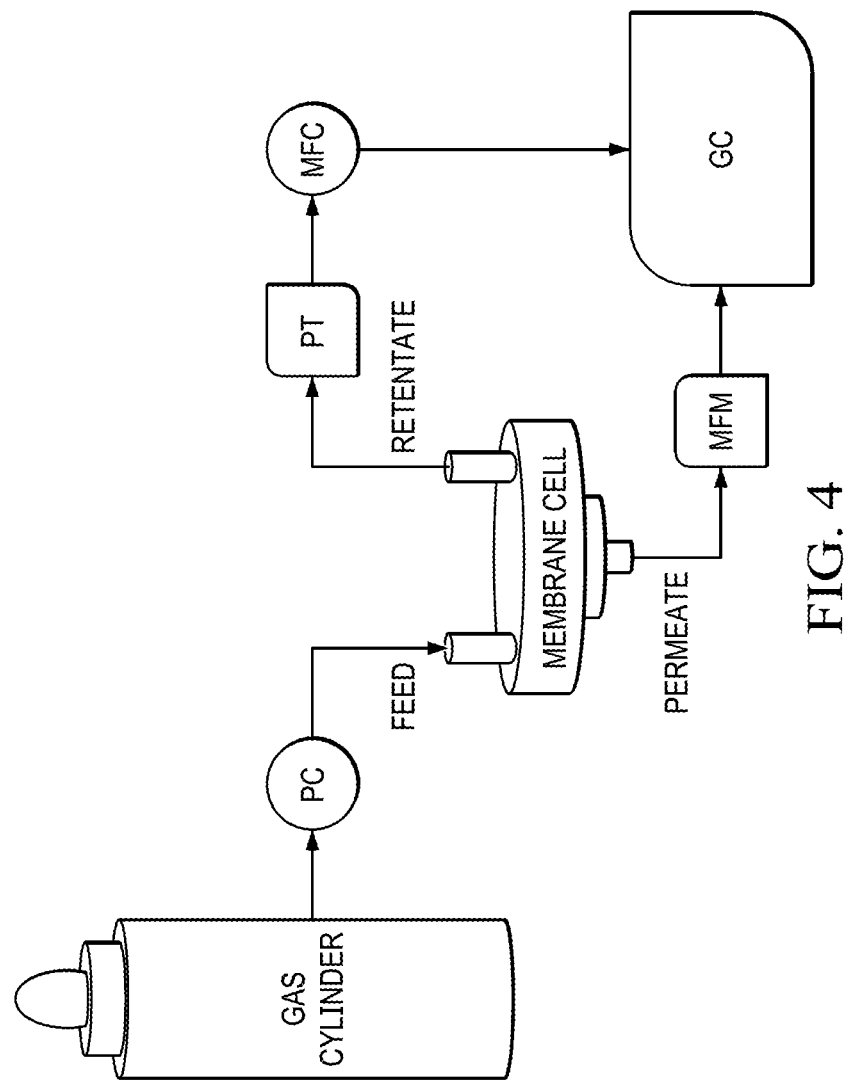
FIG. 4 schematically depicts a continuous flow constant-pressure system.

The mixed-gas permeation studies were conducted using a continuous flow constant-pressure system. FIG. 4 schematically depicts the system. A cell with a four centimeter diameter was used to hold the membrane. The feed gas was fitted with a pressure controller (PC) to maintain constant feed pressure. The retentate side included a pressure transducer (PT) to monitor any pressure changes, as well as a mass flow controller (MFC) to control the desired stage-cut. The permeate side included a mass flow meter (MFM) to measure the permeate flowrate. Both the permeate and retentate streams were connected to a micro gas chromatography (GC) to analyze the compositions of the two streams. The gas permeability of each gas was determined using the permeate flow rate and gas composition.

The results are listed in Table 1.

Protecting Layers

Membranes 1 and 2 were selected with characteristic properties to be employed as protecting layers (top membranes) and membranes 3 and 4 are chosen for their potential use as selective layers (bottom membranes). To prove the concept, membranes 1 and 3 and membranes 2 and 4 were stacked and their overall mixed-gas permeation properties were determined. The results are shown in Table 1.

Table 1 shows sweet mixed-gas permeability and selectivity coefficients of membranes 1, 2, 3, and 4, and their corresponding stacked sets 1/3 and 2/4 at various feed pressures and 22° C.

TABLE 1

| Polymer | P (psi) | $N_2$ | $CH_4$ | $C_2H_6$ | $CO_2$ | $CO_2$/ $CH_4$ |
|---|---|---|---|---|---|---|
| Membrane 1 | 300 | 19.3 | 20.7 | 8.40 | 470.4 | 22.7 |
| | 500 | 17.2 | 17.9 | 6.50 | 374.3 | 20.9 |
| | 700 | 127.1 | 128 | 13.9 | 594.3 | 4.64 |
| Membrane 2 | 300 | 21.8 | 24.7 | 6.0 | 561.3 | 22.7 |
| | 500 | 17.4 | 19.8 | 4.8 | 420.6 | 21.2 |
| | 700 | 15.7 | 17.5 | 6.5 | 337.7 | 19.3 |
| | 800 | 15.9 | 16.0 | 6 | 282.8 | 17.7 |
| Membrane 3 | 300 | 5.8 | 5.7 | 1.9 | 162.6 | 28.5 |
| | 500 | 5.5 | 5.5 | 1.2 | 138.4 | 25.2 |
| | 700 | 5.0 | 4.8 | 2 | 119.6 | 24.9 |
| | 900 | 5.5 | 5.3 | 1.9 | 119.2 | 22.5 |
| | 1100 | 117.2 | 117 | 29 | 212.8 | 1.82 |
| Membrane 4 | 300 | 2.28 | 2.11 | 0.496 | 84.5 | 40.0 |
| | 500 | 2.08 | 1.87 | 0.485 | 62.7 | 33.5 |
| | 700 | 2.23 | 2.05 | 0.534 | 59.4 | 29.0 |
| | 900 | 2.43 | 2.13 | 0.480 | 55.4 | 26.0 |
| | 1000 | 2.70 | 2.34 | 1.16 | 61.1 | 26.1 |
| Stacked Membrane 1/3 | 300 | 7.6 | 8.60 | 1.60 | 176.4 | 20.5 |
| | 500 | 8.0 | 9.10 | 2.10 | 166.9 | 18.3 |
| | 700 | 7.4 | 8.10 | 1.70 | 153.9 | 19.0 |
| | 900 | 7.1 | 7.50 | 1.50 | 136.5 | 18.2 |
| | 1100 | 7.1 | 7.40 | 1.30 | 124.6 | 16.8 |

TABLE 1-continued

| Polymer | P (psi) | $N_2$ | $CH_4$ | $C_2H_6$ | $CO_2$ | $CO_2$/ $CH_4$ |
|---|---|---|---|---|---|---|
| Stacked Membrane 2/4 | 300 | 2.4 | 2.3 | 0.8 | 80.9 | 35.2 |
| | 500 | 3.8 | 2.8 | 5.7 | 79.5 | 28.4 |
| | 700 | 3.4 | 2.8 | 4.6 | 77.5 | 27.7 |
| | 900 | 3.4 | 2.8 | 5.0 | 73.0 | 26.1 |
| | 1000 | 3.3 | 2.8 | 4.5 | 69.4 | 24.8 |

Figure 5A:
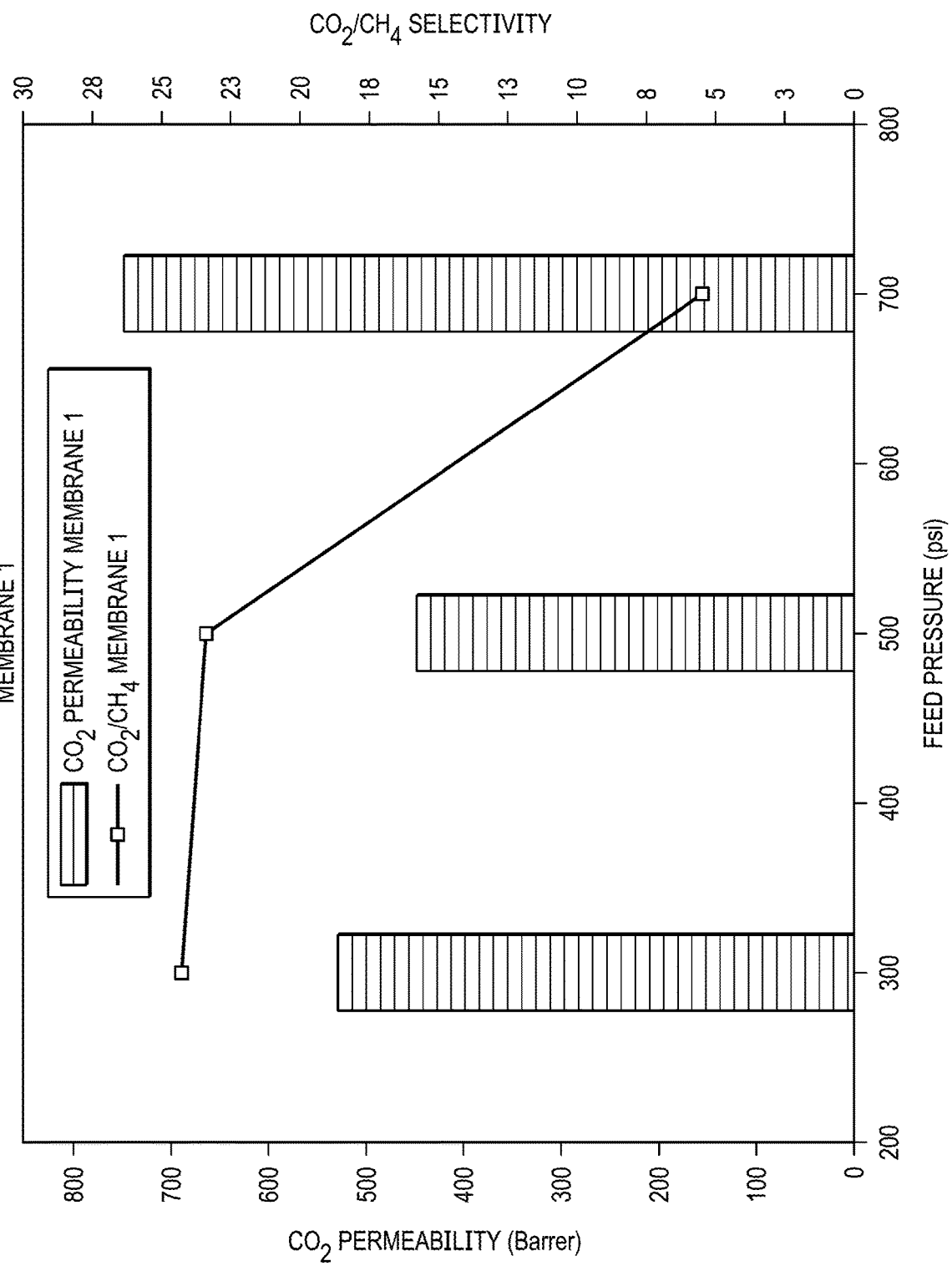

Membranes 1 and 2 were selected as protecting layers due to their relatively high mixed-gas carbon dioxide permeability coefficients, and their corresponding moderate carbon dioxide/methane selectivity coefficients. FIGS. 5A and 5B show mixed-gas permeation properties in the form of column charts for membranes 1 and 2 at various feed pressures and a temperature of 22° C.

Membrane 1 shows relatively high mixed-gas carbon dioxide permeation results up to 500 psi. However, plasticization occurred at a feed pressure of 700 psi, which is represented by loss of carbon dioxide/methane selectivity, accompanied with a sudden increase in permeation of all gas penetrants.

Membrane 2 maintained relatively high mixed-gas carbon dioxide permeation results up to 800 psi with no signs of plasticization.

The performance of membranes 1 and 2 is consistent with their selection as protecting layers for placement as top membranes in a stacked membrane system.

Selective Layers

Membranes 3 and 4 were selected as selective layers due to their relatively moderate mixed-gas carbon dioxide permeability coefficients, and their relatively high carbon dioxide/methane selectivity coefficients. FIGS. 6A and 6B show mixed-gas permeation properties in the form of column charts for membranes 3 and 4 at various feed pressures and a temperature of 22° C.

Membrane 3 showed relatively moderate mixed-gas carbon dioxide permeation results up to 900 psi. However, plasticization occurred at a feed pressure of 1,100 psi, which is represented by loss of carbon dioxide/methane selectivity, accompanied with a sudden increase in permeation of all gas penetrants.

Membrane 4 maintained relatively moderate mixed-gas carbon dioxide permeation results up to 1,000 psi with no signs of plasticization.

The performance of membranes 3 and 4 was consistent with their selection as selective layers for placement as bottom membranes in a stacked membrane system.

Stacked Membranes

Figure 7A:
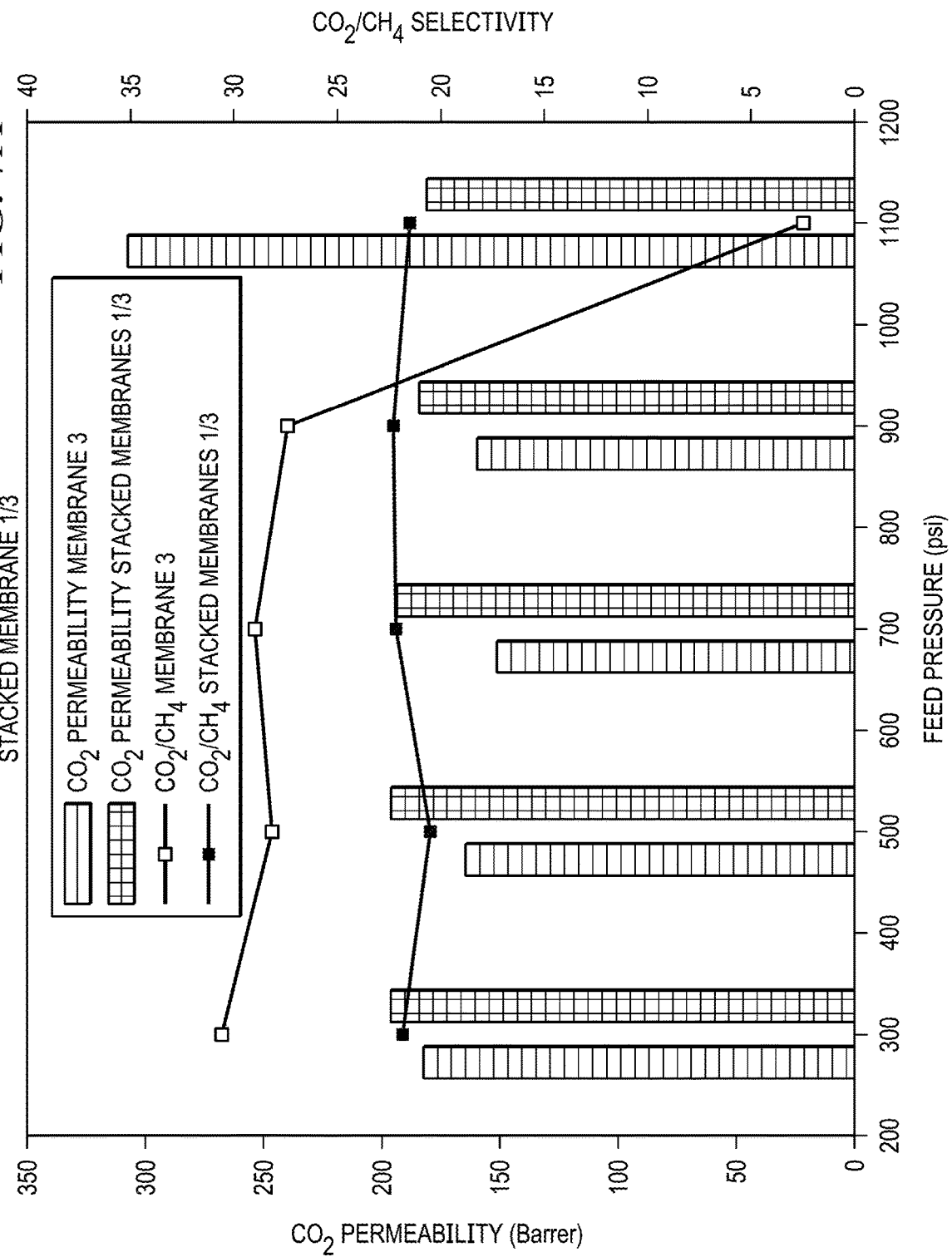

Based on the mixed-gas permeation results obtained for the individual membranes, membranes 1 and 3 were used to make a stacked membrane (stacked membrane 1/3), and membranes 2 and 4 were used to make another stacked membrane (stacked membrane 2/4). The mixed-gas permeation properties of the stacked membranes are shown in Table 1, and FIGS. 7A and 7B show column charts of the results for the stacked membranes at various feed pressures and a temperature of 22° C.

The mixed-gas permeation results of the stacked membrane 1/3 show an increase of carbon dioxide permeability coefficients, with a slight decrease in carbon dioxide/methane selectivity coefficients relative to membrane 3 alone at all feed pressures studied below 1,100 psi. For example, at 900 psi, the carbon dioxide permeability of the stacked membrane 1/3 increased by ~15%, whereas the carbon dioxide/methane selectivity coefficient decreased by ~19% when compared to the corresponding coefficient of the individual membrane 3. Interestingly, the stacked membrane 1/3 did not show any sign of plasticization at a feed pressure of 1,100 psi, at which membrane 3 plasticized. It is to be noted that membrane 1 plasticizes at 700 psi as mentioned previously. Thus, the stacked membrane 1/3 clearly shows improvement of the plasticization resistance of a stacked membrane compared to the individual membranes during mixed-gas separation at high feed pressures.

The mixed-gas permeation results of the stacked membrane 2/4 show an increase of carbon dioxide permeability coefficients, with an insignificant decrease in carbon dioxide/methane selectivity coefficients relative to membrane 4 at all feed pressures studied. For example, at 900 psi, the carbon dioxide permeability of the stacked membrane 2/4 increased by approximately 32%, whereas the carbon dioxide/methane selectivity coefficient remained unchanged when compared to the corresponding coefficients of the individual membrane 4. It is to be noted that the stacked membrane 2/4 did not show signs of plasticization at a feed pressure of 1000 psi. Thus, the stacked membrane 2/4 clearly shows improvement of the mixed-gas permeation properties of the stacked membrane compared to individual membranes during mixed-gas separation at high feed pressures.

Other Embodiments

While certain embodiments have been described other embodiments are also possible.

As an example, while embodiments have been described in which a stacked membrane is used for gas separation by itself, the disclosure is not limited to such embodiments. In some embodiments, the stacked membrane technology can be combined (hybridized) with another existing technology such as liquid-amine scrubbing process for natural gas processing. Employing a membrane-amine hybrid process can reduce the capital expenditure and/or the operating expenditure compared, for example, to an existing energy-intensive liquid-amine scrubbing process.

As another example, while use of a stacked membrane to separate certain gases has been described, the disclosure is not limited to such uses. In general, a stacked membrane can be used to separate various gases. In some embodiments, a stacked membrane can be used to separate hydrogen, helium, carbon monoxide, oxygen, nitrogen, ammonia, a sulfur oxide, a nitrogen oxide, a hydrocarbon such as methane, or ethane), an unsaturated hydrocarbon such as propylene or a perfluoro compound such as tetrafluoroethane from a mixture of gases. In certain embodiments, the stacked membrane can be used to separate at least one kind of acidic gas from a gas mixture of acidic gas and non-acidic gas. Examples of acidic gas include carbon dioxide, hydrogen sulfide, carbonyl sulfide, a sulfur oxide ($SO_x$), and a nitrogen oxide ($NO_x$).

As a further example, while stacked membranes have been described in which one membrane (e.g., selective membrane) is in direct contact with another membrane (e.g., protecting layer), the disclosure is not limited to such embodiments. More generally, it is possible to include one or more layers between the selective membrane and the protecting membrane. In general, such intermediate layers are porous and/or display properties such that the intermediate layer(s) do not interfere with the gas separation process.

Other embodiments are encompassed within the claims.

What is claimed is:

1. A membrane system, comprising:
   a first membrane; and
   a second membrane,
   wherein, at a temperature and pressure:
      the first membrane has a permeation rate for a first gas and a selectivity for a gas mixture comprising the first gas a second gas different from the first gas;
      the second membrane has a permeation rate for the first gas and a selectivity for the gas mixture;
      the permeation rate of the first membrane is greater than the permeation rate of the second membrane; and
      the selectivity of the second membrane is greater than the selectivity of the first membrane; and
   wherein at least one of the following holds:
      the selectivity of the membrane system at a pressure of 1,100 psi is within 30% of the selectivity of the membrane system at a pressure of 500 psi; and
      the selectivity of the membrane system at a pressure of 700 psi is within 30% of the selectivity of the membrane system at a pressure of 500 psi.

2. The membrane system of claim 1, wherein the permeation rate of the first membrane is at least two times greater than the permeation rate of the second membrane.

3. The membrane system of claim 1, wherein the selectivity of the second membrane is at least 1.5 times greater than the selectivity of the first membrane.

4. The membrane system of claim 1, wherein at least one of the following holds:
   the first membrane comprises a first material, and the selectivity of the first material at 1,100 psi is more than 50% different from the selectivity of the first material at 500 psi;
   the first membrane comprises a first material, and the selectivity of the first material at 700 psi is more than 50% different from the selectivity of the first material at 500 psi;
   the second membrane comprises a second material, and the selectivity of the second material at 1,100 psi is more than 50% different from the selectivity of the second material at 500 psi; and
   the second membrane comprises a second material, and the selectivity of the second material at 700 psi is more than 50% different from the selectivity of the second material at 500 psi.

5. The membrane system of claim 1, wherein the first gas is selected from the group consisting of carbon dioxide and hydrogen sulfide, and the second gas is methane.

6. The membrane system of claim 1, wherein:
   the gas mixture further comprises a third gas different from the first and second gases;
   the first membrane has a permeation rate for the third gas;
   the second membrane has a permeation rate for the third gas; and
   the permeation rate of the first membrane for the third gas is greater than the permeation rate of the second membrane for the third gas.

7. The membrane system of claim 6, wherein the first gas is carbon dioxide, the second gas is methane, and the third gas is hydrogen sulfide.

8. The membrane system of claim 1, wherein the first membrane and the second membrane form a hollow fiber stacked membrane, or first membrane and the second membrane form a planar stacked membrane.

9. The membrane system of claim 1, wherein:
the first membrane comprises a first material;
the second membrane comprises a second material different from the first material;
the first material comprises a material selected from the group consisting of a polymer and an inorganic material; and
the second material comprises a material selected from the group consisting of a polymer and an inorganic material.

10. The membrane system of claim 1, wherein the first membrane comprises a first polymer, and the second membrane comprises a second polymer different from the first polymer.

11. The membrane system of claim 1, wherein:
the first membrane comprises a first polymer selected from the group consisting of polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenzimidazoles, ladder polymers, and polymers with intrinsic microporosity; and
the second membrane comprises a second polymer selected from the group consisting of polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenzimidazoles, ladder polymers, and polymers with intrinsic microporosity.

12. The membrane system of claim 10, wherein the first polymer comprises a polyimide, and the second polymer comprises a polyimide.

13. The membrane system of claim 1, wherein one of the first and second membranes is coated on the other of the first and second membranes.

14. The membrane system of claim 1, further comprising a third membrane, wherein the third membrane is between the first and second membranes.

15. A gas separation system, comprising:
a gas source configured to provide a mixture comprising a first gas and a second gas different from the first gas; and
a membrane system, comprising:
a first membrane; and
a second membrane,
wherein, at a temperature and pressure:
the gas separation system is configured so that, during use of the gas separation system, the gas mixture contacts the first membrane before contacting the second membrane;
the first membrane has a permeation rate for the first gas and a selectivity for the gas mixture gas;
the second membrane has a permeation rate for the first gas and a selectivity for the gas mixture;
the permeation rate of the first membrane is greater than the permeation rate of the second membrane; and the selectivity of the second membrane is greater than the selectivity of the first membrane; and
wherein at least one of the following holds:
the selectivity of the membrane system at a pressure of 1,100 psi is within 30% of the selectivity of the membrane system at a pressure of 500 psi; and
the selectivity of the membrane system at a pressure of 700 psi is within 30% of the selectivity of the membrane system at a pressure of 500 psi.

16. The system of claim 15, wherein:
the gas source is a natural gas source;
the first gas comprises a member selected from the group consisting of carbon dioxide and hydrogen sulfide; and
the second gas comprises methane.

17. A membrane system, comprising:
a first membrane; and
a second membrane,
wherein, at a temperature and pressure:
the first membrane has a permeation rate for a first gas and a selectivity for a gas mixture comprising the first gas a second gas different from the first gas;
the second membrane has a permeation rate for the first gas and a selectivity for the gas mixture;
the permeation rate of the first membrane is greater than the permeation rate of the second membrane; and
the selectivity of the second membrane is greater than the selectivity of the first membrane; and
wherein;
one of the first and second membranes is coated on the other of the first and second membranes;
the first membrane comprises a first polymer selected from the group consisting of polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenzimidazoles, ladder polymers, and polymers with intrinsic microporosity; and
the second membrane comprises a second polymer selected from the group consisting of polyimides, polyoxadiazoles, polytriazoles, polyazoles, polysulfones, polyethersulfones, polyvinylidenedifluorides, polyacrylonitriles, polyamides, polyamide-imides, polyethylenes, polypropylenes, cellulose acetates, polyetheretherketones, polybenzimidazoles, ladder polymers, and polymers with intrinsic microporosity.

18. The membrane system of claim 17, further comprising a gas source configured to provide a mixture comprising the first gas and the second gas;
wherein the membrane system is configured so that, during use of the membrane system, the gas mixture contacts the first membrane before contacting the second membrane.

19. The membrane system of claim 17, wherein the first polymer comprises a polyimide, and the second polymer comprises a polyimide.

* * * * *

UNITED STATES PATENT AND TRADEMARK OFFICE
CERTIFICATE OF CORRECTION

PATENT NO. : 12,083,474 B2
APPLICATION NO. : 17/551519
DATED : September 10, 2024
INVENTOR(S) : Ali Hayek et al.

It is certified that error appears in the above-identified patent and that said Letters Patent is hereby corrected as shown below:

In the Claims

In Column 19, Line 24, Claim 11, please replace "polybenimidazoles" with -- polybenzimidazoles --

In Column 19, Line 32, Claim 11, please replace "polybenimidazoles" with -- polybenzimidazoles --

In Column 20, Line 40, Claim 17, please replace "polybenimidazoles" with -- polybenzimidazoles --

In Column 20, Line 48, Claim 17, please replace "polybenimidazoles" with -- polybenzimidazoles --

Signed and Sealed this
Twenty-ninth Day of October, 2024

Katherine Kelly Vidal
*Director of the United States Patent and Trademark Office*